United States Patent
Kato

(10) Patent No.: US 10,338,936 B2
(45) Date of Patent: *Jul. 2, 2019

(54) METHOD FOR CONTROLLING SCHEDULE OF EXECUTING APPLICATION IN TERMINAL DEVICE AND TERMINAL DEVICE IMPLEMENTING THE METHOD

(71) Applicant: Sony Mobile Communications Inc., Tokyo (JP)

(72) Inventor: Koichi Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,349

(22) Filed: Dec. 13, 2016

(65) Prior Publication Data
US 2017/0090951 A1 Mar. 30, 2017

Related U.S. Application Data

(63) Continuation of application No. 13/626,111, filed on Sep. 25, 2012, now Pat. No. 9,569,256.

(51) Int. Cl.
*G06F 1/3228* (2019.01)
*G06F 9/4401* (2018.01)
*G06F 1/3296* (2019.01)
*G06F 9/48* (2006.01)
*G06F 1/3287* (2019.01)

(52) U.S. Cl.
CPC .......... *G06F 9/4418* (2013.01); *G06F 1/3228* (2013.01); *G06F 1/3287* (2013.01); *G06F 1/3296* (2013.01); *G06F 9/4837* (2013.01); *Y02D 10/172* (2018.01); *Y02D 10/24* (2018.01)

(58) Field of Classification Search
CPC ....................................................... G06F 1/329
See application file for complete search history.

(56) References Cited

U.S. PATENT DOCUMENTS 6,009,454 A 12/1999 Dummermuth
6,769,120 B1 7/2004 Rodriguez
(Continued)

FOREIGN PATENT DOCUMENTS

JP 2004320153 11/2004

*Primary Examiner* — Kim Huynh
*Assistant Examiner* — Eric Chang
(74) *Attorney, Agent, or Firm* — Xsensus LLP

(57) ABSTRACT

A method may include associating, with a timer-B, a second application in a terminal device; setting the terminal device in a standby mode; and executing the second application when a processor in the terminal device wakes up after the timer-B measures a second amount of elapsed time. The timer-B may not initiate wake-up of the processor. The method may further include determining whether the second application is associated with the timer-B or a timer-A when the terminal device receives a command of setting the terminal device in the standby mode; and when the second application is determined as being associated with the timer-A, unassociating the second application with the timer-A. The timer-A may initiate wake-up of the processor when the timer-A measures another second amount of elapsed time while the terminal device is the standby mode. A timer associated with a first application may initiate wakeup of the processor.

4 Claims, 13 Drawing Sheets

(56) References Cited

U.S. PATENT DOCUMENTS

| | | | |
|---|---|---|---|
| 9,152,199 B2 * | 10/2015 | Stemen | G06F 1/3203 |
| 2004/0153890 A1 | 8/2004 | Davis et al. | |
| 2010/0131789 A1 * | 5/2010 | Kimura | G06F 11/1441 |
| | | | 713/323 |
| 2010/0184383 A1 * | 7/2010 | Lerke | H04R 25/552 |
| | | | 455/66.1 |

* cited by examiner

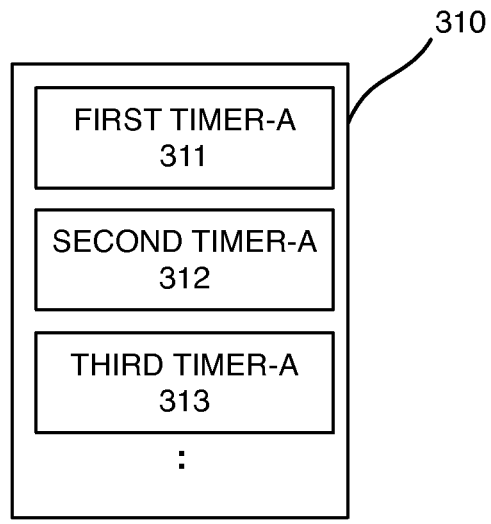
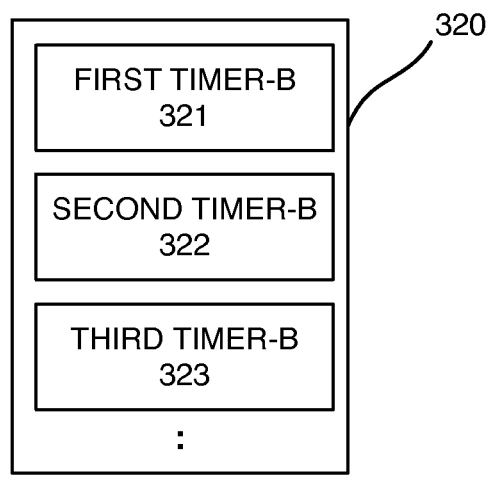
FIG. 3B

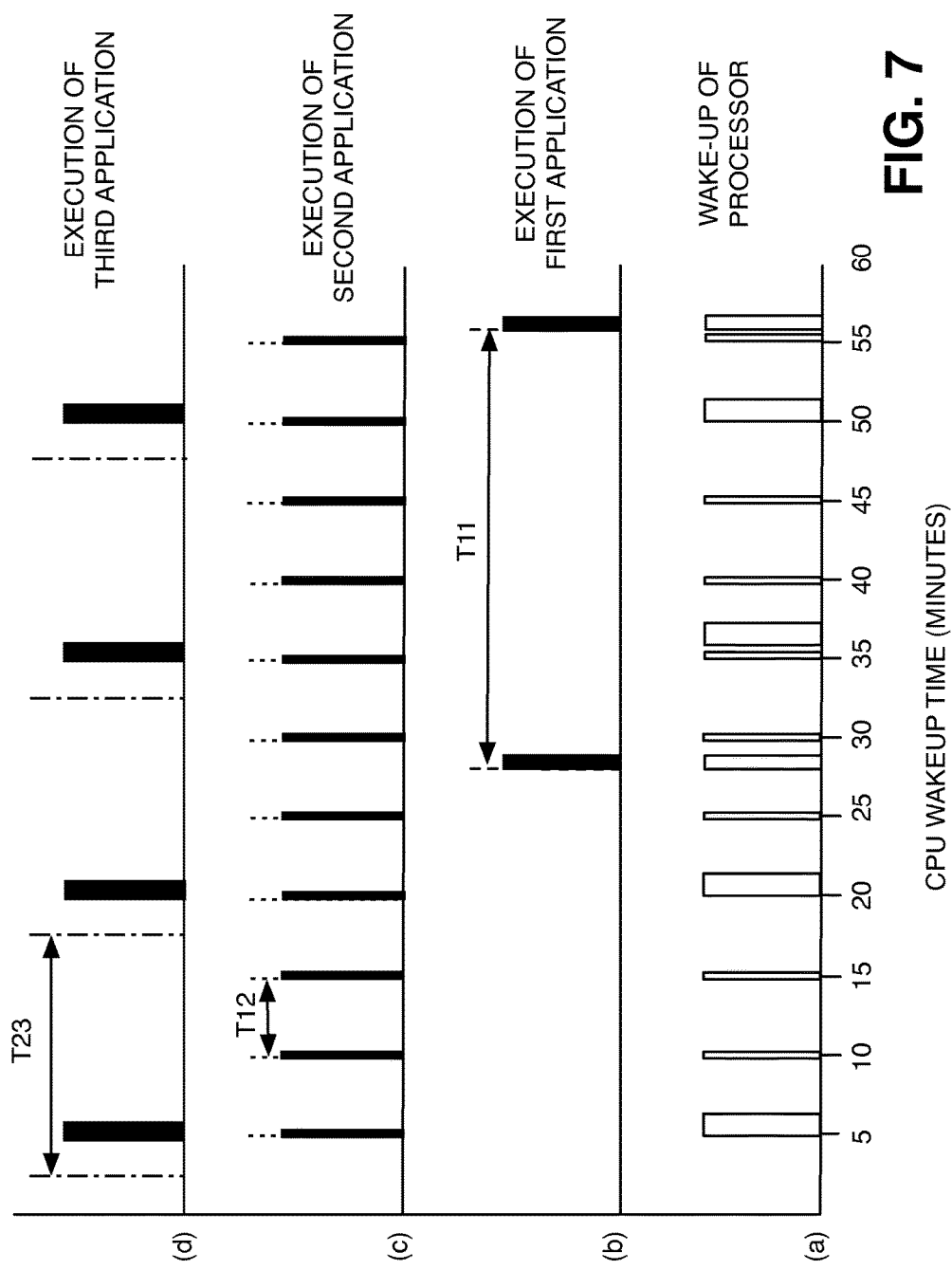

METHOD FOR CONTROLLING SCHEDULE OF EXECUTING APPLICATION IN TERMINAL DEVICE AND TERMINAL DEVICE IMPLEMENTING THE METHOD

TECHNICAL FIELD

Embodiments disclosed relate generally to a method for controlling a schedule of executing an application in a terminal device and a terminal device implementing the method.

BACKGROUND

Various applications may be executed in a terminal device. For example, an application for monitoring electric charge of a battery associated with the terminal device, an application for monitoring a status of a process running in the terminal device, etc., may be executed in the terminal device. In order to execute the applications, the terminal device may consume electric power provided by the battery because a processor and/or other components in the terminal device operate to execute the application. On the other hand, to reduce consumption of electric power to be provided by the battery, the terminal device may be set in the standby mode. However, even when the terminal device is set in the standby mode, the processor in the terminal device may wake up to execute a certain application occasionally or periodically. Also, other applications may be executed when the processor wakes up to execute the certain application. Accordingly, more electric power may be consumed than expected when the terminal device is set in the standby mode, and therefore, electric charge of the battery may decrease more than expected.

SUMMARY

In one aspect, a method may include: associating, with a second timer in a second timer group, a second application in a terminal device; setting the terminal device in a standby mode; and executing the second application when a processor in the terminal device wakes up after the second timer in the second timer group measures a second amount of elapsed time. The second timer in the second timer group may be configured not to initiate wake-up of the processor.

In one aspect, the method may include: determining whether the second application is associated with the second timer in the second timer group or a second timer in a first timer group when the terminal device receives a command of setting the terminal device in the standby mode; and when the second application is determined as being associated with the second timer in the first timer group, unassociating the second application with the second timer in the first timer group. The second timer in the first timer group may be configured to initiate wake-up of the processor when the second timer in the first timer group measures another second amount of elapsed time while the terminal device is the standby mode.

The second amount of elapsed time measured by the second timer in the second timer group may be substantially equal to the second amount of elapsed time measured by the second timer in the first group.

In one aspect, the method may include: storing information regarding the second timer in the first timer group in a memory of the terminal device when the terminal device receives a command of setting the terminal device in the standby mode, and retrieving the information regarding the second timer in the first timer group from the memory when the terminal device receives a command of setting the terminal device in an operating mode.

In one aspect, the method may include: waking up the processor when a first timer in the first timer group measures a first amount of elapsed time while the terminal device is in the standby mode.

In one aspect, the method may include: executing a first application when the processor wakes up.

The first application may be a data synchronization application.

The first amount of time may be longer than the second amount of elapsed time measured by the second timer in the second timer group.

The second timer in the second timer group may repeat initialization of the second timer in the second timer group and measurement of the second amount of elapsed time until the terminal device receives a command of setting the terminal device in an operating mode.

The second application may be configured to monitor remaining electric charge of a battery associated with the terminal device.

In one aspect, a terminal device may include a memory configured to store a second application; a second timer in a second timer group; and a processor configured to: associate the second application with the second timer in the second timer group, and execute the second application when the processor wakes up after the second timer in the second timer group measures a second amount of elapsed time. The second timer in the second timer group may be configured not to initiate wake-up of processor.

In one aspect, the terminal device may be include: a second timer in a first timer group configured to initiate wake-up of the processor when the second timer in the first timer group measures another second amount of elapsed time while the terminal device is in the standby mode. The processor may further be configured to determine whether the second application is associated with the second timer in the second timer group or the second timer in the first timer group when the terminal device receives a command of setting the terminal device in the standby mode, and unassociate the second application with the second timer in the first timer group when the processor determines that the second application is associated with the second timer in the first timer group.

The processor may be configured to instruct the memory to store information regarding the second timer in the first timer group when the terminal device receives a command of setting the terminal device in the standby mode, and retrieve the information regarding the second timer in the first timer group from the memory when the terminal device receives a command of setting the terminal device in an operating mode.

The terminal device may include a first timer in the first timer group configured to initiate wake-up of the processor when the first timer in the first timer group measures a first amount of elapsed time while the terminal device is in the standby mode.

The processor may be configured to execute a first application when the processor wakes up.

The first application may be a data synchronization application.

The second timer in the second timer group may repeat initialization of the second timer in the second timer group and measurement of the second amount of elapsed time until the terminal device receives a command of setting the terminal device in the operating mode.

The second application may be configured to monitor remaining electric charge of a battery associated with the terminal device.

In one aspect, a computer-readable non-transitory medium comprising computer-executable instructions of: associating, with a second timer in a second timer group, a second application in a terminal device; setting the terminal device in a standby mode; and executing the second application when a processor in the terminal device wakes up after the second timer in the second timer group measures a second amount of elapsed time. The second timer in the second timer group may be configured not to initiate wake-up of the processor.

In one aspect, the computer-readable non-transitory medium may include instructions of: determining whether the second application is associated with the second timer in the second timer group or a second timer in a first timer group when the terminal device receives a command of setting the terminal device in the standby mode; and when the second application is determined as being associated with the second timer in the first timer group, unassociating the second application with the second timer in the first timer group. The second timer in the first timer group is configured to initiate wake-up of the processor when the second timer in the first timer group measures another second amount of elapsed time while the terminal device is the standby mode.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 3B is a block diagram of exemplary timers included in the first timer group and a block diagram of exemplary timers included in the second timer group;

FIG. 7 is a diagram presenting exemplary timings of wake-up of the processor and execution of the application when the timer associated with the second application is not replaced/changed in response to receiving the command of setting the terminal device of FIG. 1 in the standby mode;

FIG. 9 is a graph of an exemplary relationship between an amount of elapsed time and remaining electric charge of the battery associated with the terminal device of FIG. 1 when a switch of the terminal device is on.

DETAILED DESCRIPTION

The following detailed description refers to the accompanying drawings. The same reference numbers in different drawings may identify the same or similar elements.

Figure 1:
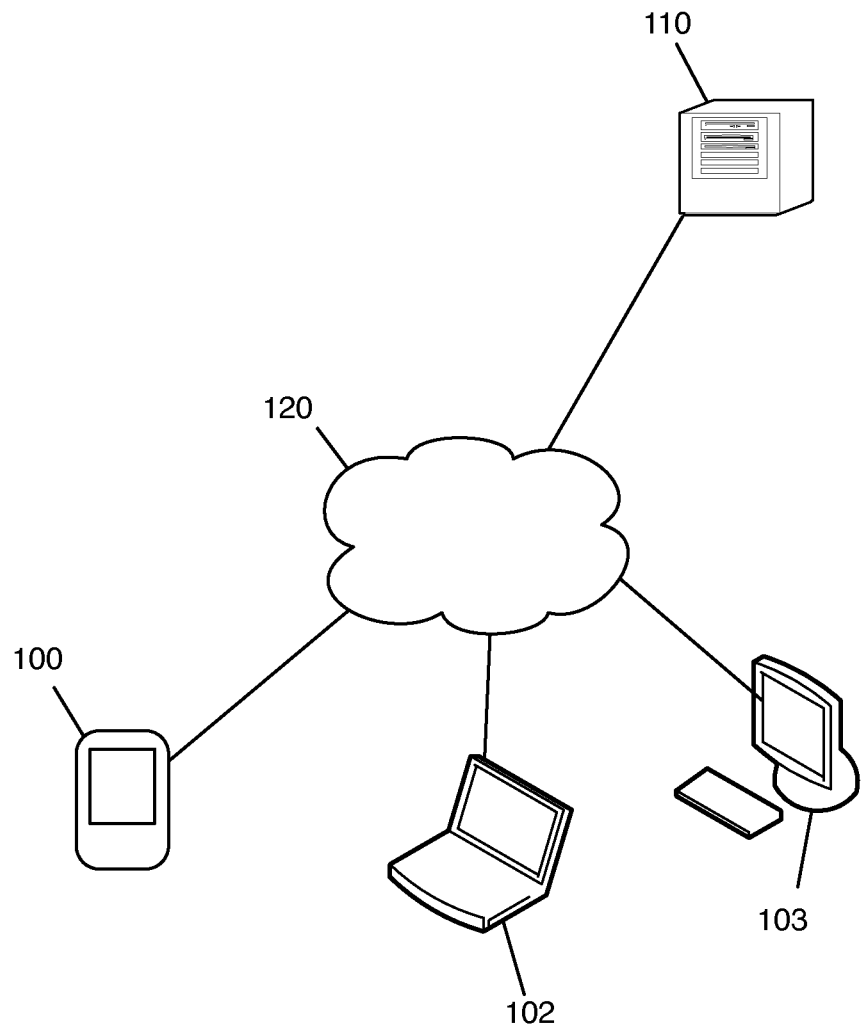
FIG. 1 is a diagram of an exemplary environment in which embodiments disclosed herein are implemented.

FIG. 1 is a diagram of an exemplary environment in which embodiments disclosed herein are implemented. A terminal device 100 may be connected to a server 110 via a network 120. Additionally, one or more terminal devices, i.e., a second terminal device 102, a third terminal device 103, etc., may be connected with the server 110 via the network 120. The network 120 may be wired or wireless.

The terminal device 100 may send data to the server 110 via the network 120. The data sent from the terminal device 100 may be stored in the server 110. The server 110 may send the data to the second terminal device 102, the third terminal device 103, and/or other terminal devices, via the network 120 to synchronize the data among the terminal device 100, the second terminal device 102, and the third terminal device 103, and/or other terminal device(s).

The server 110 may receive and store other data sent from, for example, the second terminal device 102 via the network 120. The server 110 may send the other data to the terminal device 100, the third terminal device 103, and/or the other terminal device(s), via the network 120 to synchronize the other data among the second terminal device 102, the terminal device 100, the third terminal device 103, and/or the other terminal device(s).

Figure 2:
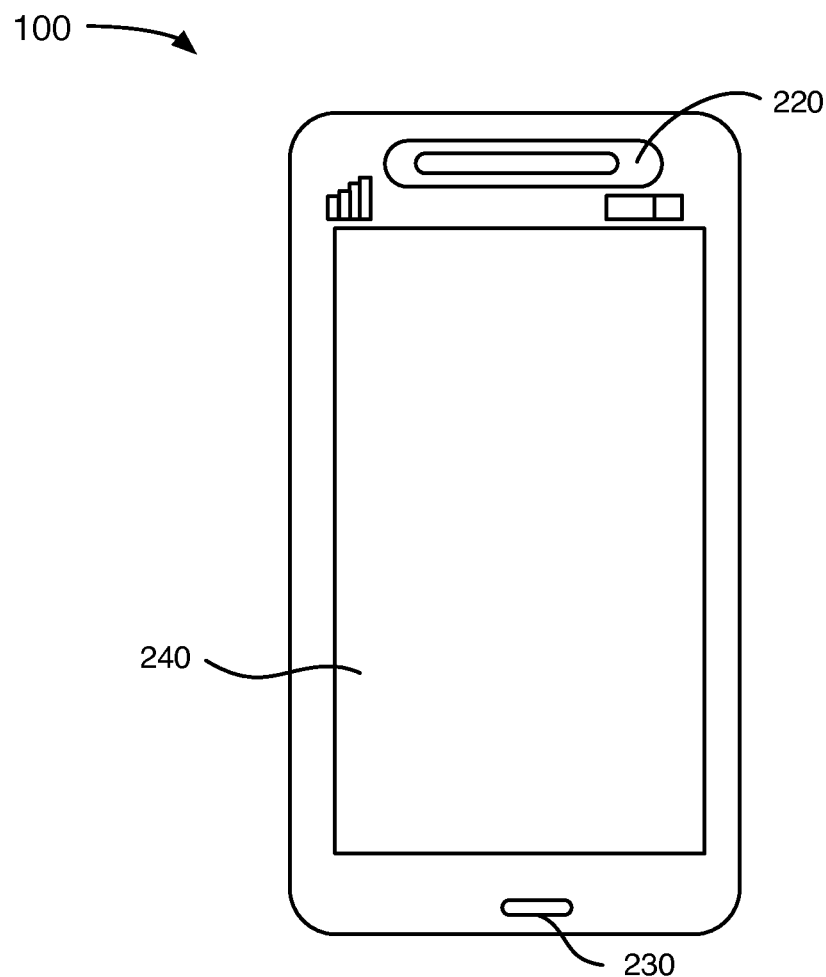
FIG. 2 is a diagram of an exemplary terminal device of FIG. 1.

FIG. 2 is a diagram of an exemplary terminal device of FIG. 1. The terminal device 100 may include a speaker 220, a microphone 230, and a display 240. As used herein, the term "terminal device" may include mobile devices such as a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Terminal devices may also be referred to as "pervasive computing" devices. It should also be understood that systems and methods described herein may also be implemented in other devices that display information of interest and allow users to interact with the displayed information. For example, terminal devices may include a personal computer (PC), a laptop computer, a tablet computer, a netbook, a media playing device (e.g., an MPEG audio layer 3 (MP3) player, a video game playing device, etc.), a global positioning system (GPS) device, etc.

The speaker 220 may provide audible information to a user of the terminal device 100. For example, the speaker 220 may output music, ringtones, announcement to provide information regarding an update of the software installed in the terminal device 100, etc. The microphone 230 may receive audible information from the user of the terminal device 100.

The display 240 may be a liquid crystal display, organic liquid crystal display or any other type of display. The display 240 may provide visual information to the user. For example, the display 240 may provide information regarding a status of a battery associated with the terminal device 100.

The information regarding a status of a battery may include remaining electric charge of the battery 315.

The display 240 may provide information regarding incoming or outgoing telephone calls, electronic mail (e-mail), instant messages, short message service (SMS) messages, etc. The display 240 may also display information (not shown) regarding various applications stored in the terminal device 100, such as an email program, a camera program/function, a phone book/contact list, an Internet browser used to access/download content (e.g., news or other information), etc. In an exemplary implementation, the display 240 may be a touch screen display device that allows a user to enter commands and/or information via a finger, a stylus, a mouse, a pointing device, or some other device. For example, the display 240 may be a resistive touch screen, a capacitive touch screen, an optical touch screen, an infrared touch screen, a surface acoustic wave touch screen, or any other type of touch screen device that registers an input based on a contact with the screen. The display 240 may also provide control buttons and/or a keypad, such as a soft telephone keypad (not shown), that permit the user to interact with the terminal device 100 to cause the terminal device 100 to perform one or more operations, such as place a telephone call, access information, etc.

The one or more terminal devices, i.e., the second terminal device 102, the third terminal device 103, and/or the other terminal device(s) may include at least one of elements similar to the elements described above with respect to the terminal device 100.

Figure 3A:
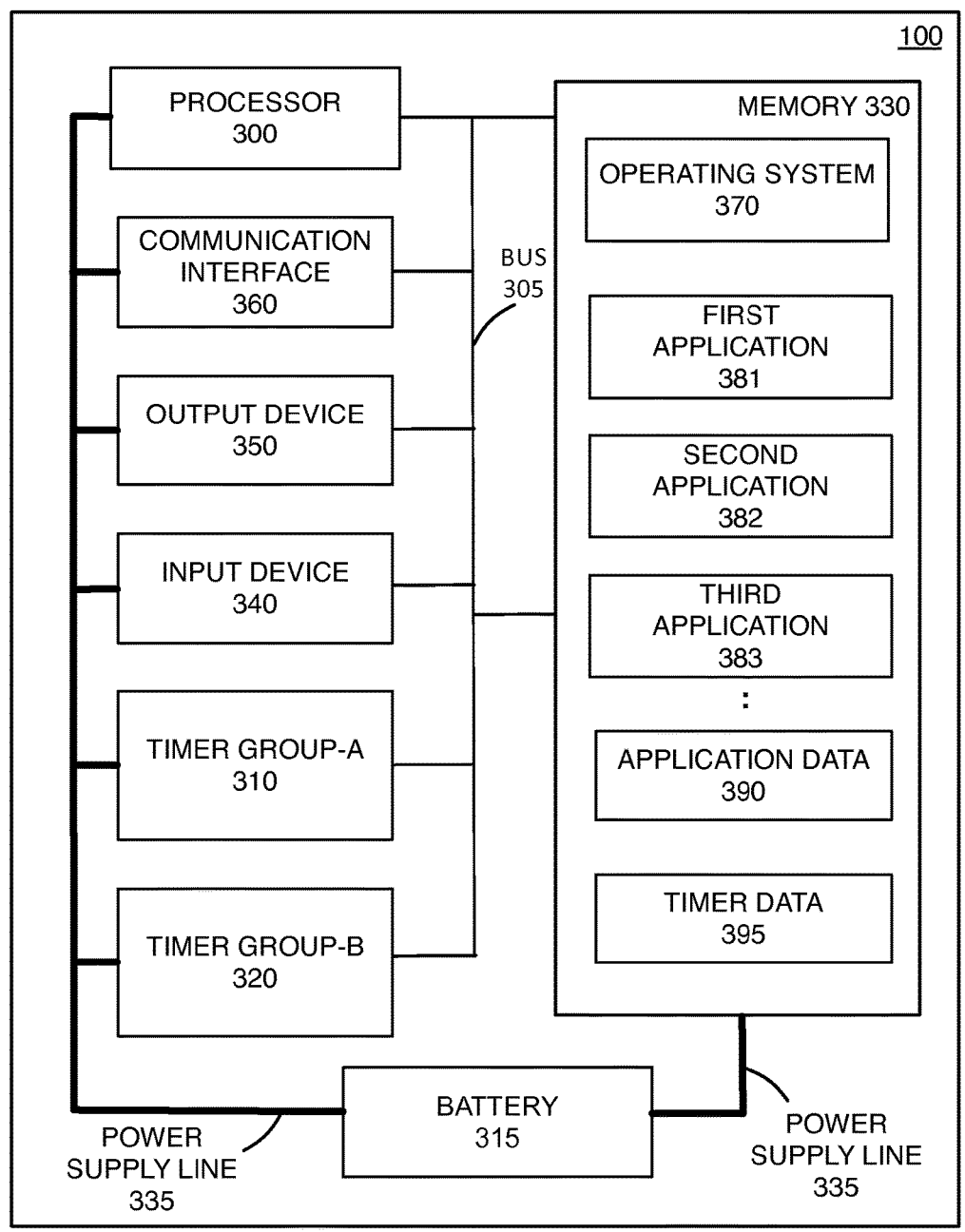
FIG. 3A is a block diagram of exemplary components of the terminal device of FIG. 1.

FIG. 3A is a block diagram of exemplary components of the terminal device of FIG. 1. The terminal device 100 may include a processor 300, a memory 330, a first timer group 310, a second timer group 320, an input device 340, an output device 350, and a communication interface 360. The memory 330 may include a plurality of memories. A bus 305 may permit communication among the components of the terminal device 100.

A battery 315 may be associated with the terminal device 100 to supply electric power to the terminal device 100. The battery 315 may be electrically connected with the components in the terminal device 100 via power supply lines 335. The battery 315 may be disposed in the terminal device 100, as illustrated in FIG. 3A. Alternatively, the battery 315 may be disposed outside the terminal device 100.

One skilled in the art would recognize that the terminal device 100 may be configured in a number of other ways and may include other or different elements. For example, the terminal device 100 may include one or more modulators, demodulators, encoders, decoders, etc., for processing data.

The processor 300 may include a processor, microprocessor, a central processing unit (CPU), an application specific integrated circuit (ASIC), a field programmable gate array (FPGA) or other processing logic. The processor 300 may execute software instructions/programs or data structures to control operation of the terminal device 100.

When the terminal device 100 is powered on, the terminal device 100 may be set in an operating mode or a standby mode.

As used herein, the term "standby mode" may include a state of a terminal device in which supply of electric power to the components in the terminal device 100 may be reduced or cut off. The standby mode may include so called "a sleep mode" and "a suspend mode." When the terminal device 100 is in the standby mode, at least one of the components, for example, the processor 300 in the terminal device 100 may be idle, or supply of electric power to at least one of the components in the terminal device 100 may be reduced or stopped. Accordingly, the terminal device 100 in the standby mode may not able to perform some functions of the terminal device 100 and execute applications in the terminal device 100.

On the other hand, as used herein, the term "operating mode" may include a state of a terminal device which is not in the standby mode. More specifically, the term "operating mode" may include a state of a terminal device in which electric power may be fully supplied to the components in the terminal device. Accordingly, the terminal device 100 in the operating mode may be able to perform any function of the terminal device 100 and execute applications in the terminal device 100.

The input device 340 may include mechanisms that permit an operator to input information to the terminal device 100, such as the microphone 230, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, a stylus, voice recognition and/or biometric mechanisms, etc. In an exemplary implementation, the display 240 may be a touch screen display that acts as an input device.

The output device 350 may include one or more mechanisms that provides an output corresponding to output information to the user, including a display, such as the display 240, a printer, one or more speakers, such as speaker 220, etc. As described above, in an exemplary implementation, the display 240 may be a touch screen display. In such an implementation, the display 240 may function as both an input device and an output device.

The communication interface 360 may include a transceiver that enables the terminal device 100 to communicate with other devices and/or systems. For example, the communication interface 360 may include a modem or an Ethernet interface to a LAN. The communication interface 360 may also include mechanisms for communicating via a network, such as a wireless network. For example, the communication interface 360 may include one or more radio frequency (RF) transmitters, receivers and/or transceivers and one or more antennas for transmitting and receiving RF data via a network.

The memory 330 may include a random access memory (RAM) or another type of dynamic storage device that may store information and instructions, e.g., an application, for execution by the processor 300; a read-only memory (ROM) device or another type of static storage device that may store static information and instructions for use by the processor 300; or some other type of magnetic or optical recording medium and its corresponding drive, e.g., a hard disk drive (HDD), a solid state drive (SSD) or memory, for storing information and/or instructions.

The memory 330 may include an operating system 370, which may include software instructions for managing hardware and software resources of the terminal device 100. The operating system 370 may include Symbian, Android, Windows Mobile, iOS, or other operating systems.

The memory 330 may include a first application 381. For example, the first application 381 may be a data synchronization (sync) application that may synchronize data, such as application data 390, among multiple memories or multiple devices. In one embodiment, the Google Sync protocol developed by Google, the ActiveSync protocol developed by Microsoft, Apple Sync and Syncing protocol developed by Apple, or any data synchronization protocol may support the data sync application.

In addition, the memory 330 may include one or more applications, e.g., a second application 382, and third application 383, etc., each of which has hardware and/or software components for performing other tasks. For example, the second application 382 may monitor an amount of remaining electric charge in the battery 315 associated with the terminal device 100. The third application 383 may be a GPS application that interacts with a GPS receiver to determine a location of the terminal device 100. The memory 330 may include a personal information manager (PIM) application for handling event information (e.g., a calendar), such as the time and location of events, for example, meetings. The memory 330 may include other PIM applications, such as an address book application, an email client application, or an instant messaging application. The memory 330 may include a browser application for browsing a network, such as the Internet, for example. The memory 330 may include an application for checking and notifies a status of a process running on the terminal device 100.

The third application, which is the GPS application, and the first application 381, which is the data sync application, may synchronize or send location information to other applications or devices using the GPS Exchange Format (GPX), which is an Extensible Markup Language (XML) schema for describing GPS data. GPX data may be sent over a network using the Extensible Messaging and Presence Protocol (XMPP) over a Transmission Control Protocol (TCP) session, for example.

The applications stored in the memory 330 may be executed periodically or when a predetermined event occurs. For example, the second application 382 may monitor an amount of remaining electric charge in the battery 315 every time when a timer associated with the second application 382 measures an amount of time elapsed since the timer was initialized. Alternatively, the predetermined event may be, for example, the user's input of a request to monitor an amount of remaining charge in the battery 315.

The memory 330 may store application data 390, such as event information and/or location information for the PIM applications stored in the memory 330.

FIG. 3B is a block diagram of exemplary timers included in the first timer group 310 and a block diagram of exemplary timers included in the second timer group 320.

The first timer group 310 may include one or more timers, for example, a first timer-A 311, a second timer-A 312, a third timer-A 313, etc. The second timer group 320 may include one or more timers, for example, a first timer-B 321, a second timer-B 322, a third timer-B 323, etc.

Each of the one or more timers in the first timer group 310 may be configured to, while the terminal device 100 is set in the standby mode, initiate wake-up of the processor 300 when each of the one or more timers in the first timer group 310 measures a corresponding amount of time elapsed since each of the one or more timers in the first timer group 310 is initialized.

On the other hand, each of the one or more timers in the second timer group 320 may be configured not to initiate wake-up of the processor 300 while the terminal device 100 is set in the standby mode.

The first timer-A 311 may measure a first amount of time T11, which is elapsed since the first timer-A 311 is initialized. The first timer-A 311 may be reinitialized when the first timer-A 311 completes measurement of the first amount of elapsed time T11. The first timer-A 311 may repeat initialization of the first timer-A 311 and measurement of the first amount of elapsed time T11.

The second timer-A 312 may measure a second amount of time T12, which is elapsed since the second timer-A 312 is initialized. The second timer-A 312 may be reinitialized when the second timer-A 312 completes measurement of the second amount of elapsed time T12. The second timer-A 312 may repeat initialization of the second timer-A 312 and measurement of the second amount of elapsed time T12.

The third timer-A 313 may measure a third amount of time T13, which is elapsed since the third timer-A 313 is initialized. The third timer-A 313 may be reinitialized when the third timer-A 313 completes measurement of the third amount of elapsed time T13. The third timer-A 313 may repeat initialization of the third timer-A 313 and measurement of the third amount of elapsed time T13.

The first timer-B 321 may measure a first amount of time T21, which is elapsed since the first timer-B 321 is initialized. The first timer-B 321 may be reinitialized when the first timer-B 321 completes measurement of the first amount of elapsed time T21. The first timer-B 321 may repeat initialization of the first timer-B 321 and measurement of the first amount of elapsed time T21.

The second timer-B 322 may measure a second amount of time T22, which is elapsed since the second timer-B 322 is initialized. The second timer-B 322 may be reinitialized when the second timer-B 322 completes measurement of the second amount of elapsed time T22. The second timer-B 322 may repeat initialization of the second timer-B 322 and measurement of the second amount of elapsed time T22.

The third timer-B 323 may measure a third amount of time T23, which is elapsed since the third timer-B 323 is initialized. The third timer-B 323 may be reinitialized when the third timer-B 323 completes measurement of the third amount of elapsed time T23. The third timer-B 323 may repeat initialization of the third timer-B 323 and measurement of the third amount of elapsed time T23.

The first amount of elapsed time T11 measured by the first timer-A 311 may be substantially equal to the first amount of elapsed time T21 measured by the first timer-B 312. The second amount of elapsed time T12 measured by the second timer-A 312 may be substantially equal to the second amount of elapsed time T22 measured by the second timer-B 312. The third amount of elapsed time T13 measured by the third timer-A 313 may be substantially equal to the third amount of elapsed time T23 measured by the third timer-B 323.

The first amount of time T11 measured by the first timer-A 311 may be longer than other amounts of time measured by other timers in the first timer group. The first amount of time T21 measured by the first timer-B 321 may be longer than other amounts of time measured by other timers in the second timer group.

Assume that the terminal device 100 includes the first application 381, the second application 382, and the third application 383. When the terminal device 100 is in the operating mode, the first application 381 may be associated with the first timer-A 311, the second application 382 may be associated with the second timer-A 312, and the third application 383 may be associated with the third timer-A 313. The processor 300 may execute the first application 381 when the first timer-A 311 measures the first amount of time T11. The processor 300 may execute the second application 382 when the second timer-A 312 measures the second amount of time T12. The processor 300 may execute the third application 383 when the third timer-A 313 measures the third amount of time T13.

Figure 4:
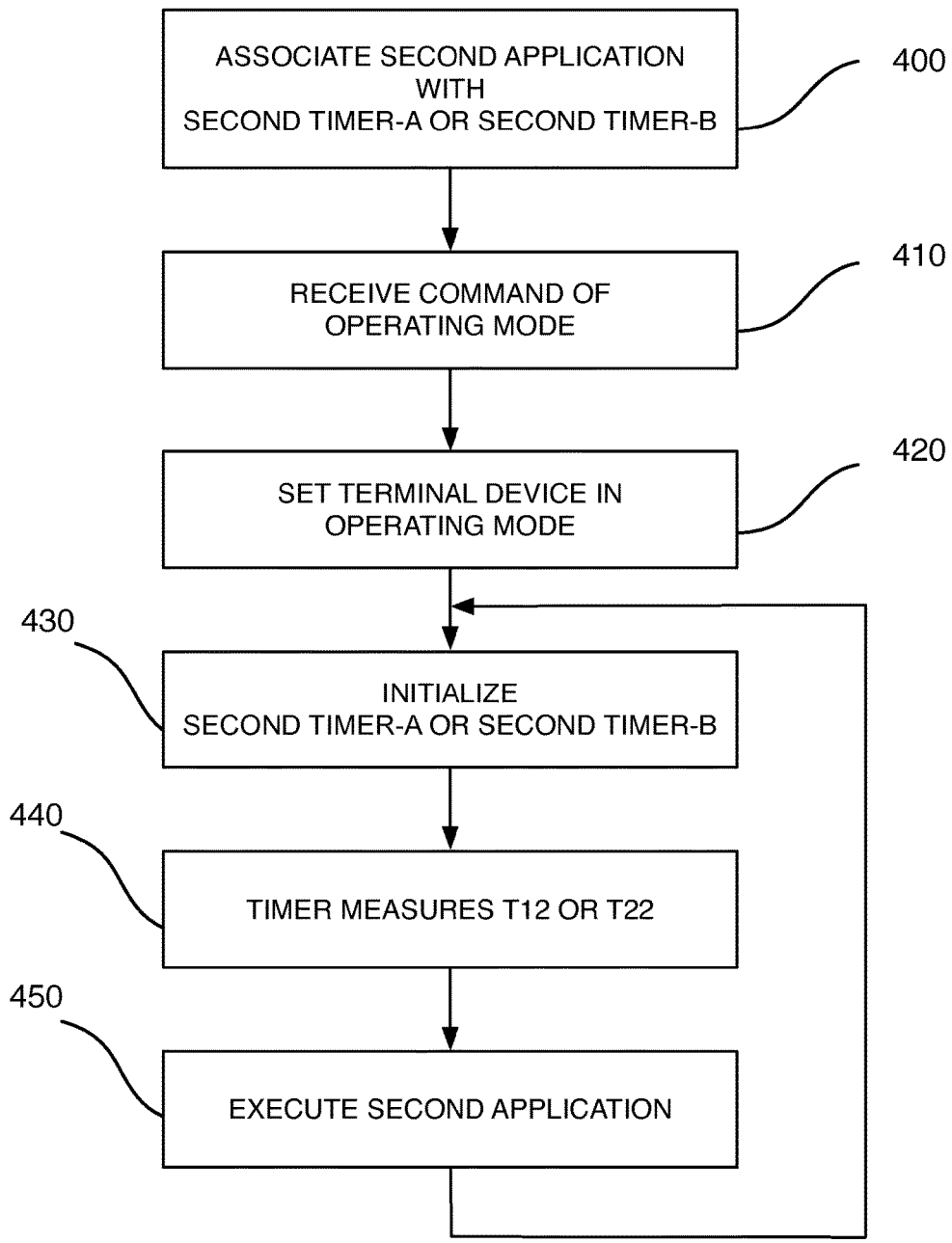
FIG. 4 is a flowchart of an exemplary process for controlling a schedule of execution of the second application in the terminal device of FIG. 1 when the terminal device is set in the operating mode.

FIG. 4 is a flowchart of an exemplary process for controlling a schedule of execution of the second application in the terminal device of FIG. 1 when the terminal device is in the operating mode. The second application 382 may be associated with the second timer-A 312 or the second timer-B 322 (block 400). The terminal device 100 may receive a command of setting the terminal device 100 in the operating mode (block 410). When the terminal device 100 receives the command of setting the terminal device 100 in the operating mode, the processor 300 of the terminal device 100 may set the terminal device 100 in the operating mode (block 420).

The processor 300 may initialize the timer associated with the second application 382, namely, the second timer-A 312 or the second timer-B 322 (block 430). Alternatively, the timer associated with the second application 382 may be automatically initialized when the terminal device 100 receives the command of setting the terminal device 100 in the operating mode.

When the timer associated with the second application 382 measures an amount of time elapsed since the timer associated with the second application 382 is initialized, namely, T12 or T22 (blocks 430-440), the processor 300 may execute the second application 382 (block 450).

The process as indicated by blocks 430-450 may be repeated when the terminal device 100 is in the operating mode. That is, the second timer-B 322 may repeat initialization of the second timer-B and measurement of the second amount of elapsed time, namely, T12 or T22 while the terminal device 100 is in an operating mode. More specifically, the timer associated with the second application 382 is initialized after the timer associated with the second application 382 measures the amount of elapsed time (blocks 430), the timer associated with the second application 382 measures the amount of elapsed time again (block 440), and the processor 300 may execute the second application 382 again (block 450).

When the first application 381 is associated with the first timer-A 311 or the first timer-B 321 and the third application 383 is associated with the third timer-A 313 or the third timer-B 323, the processor 300 may execute the first application 381 and the third application 383 in the same manner as illustrated in FIG. 4.

Instructions to perform the process described above referring to FIG. 4 may be stored in a non-transitory computer-readable medium.

Figure 5A:
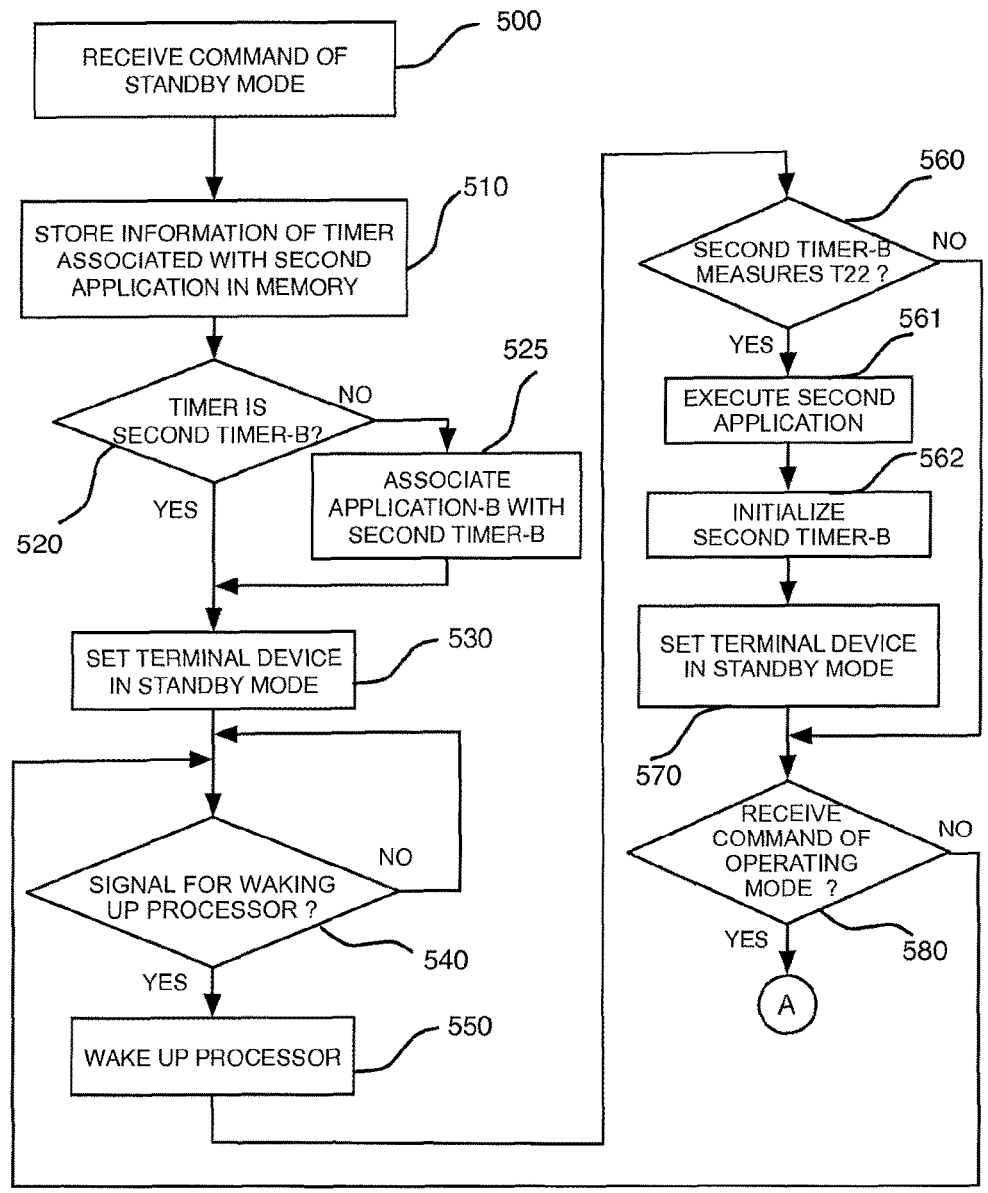
FIGS. 5A and 5B are a flowchart of an exemplary process for controlling a schedule of execution of the application in the terminal device of FIG. 1 when the terminal device is set in the standby mode.
Figure 5B:
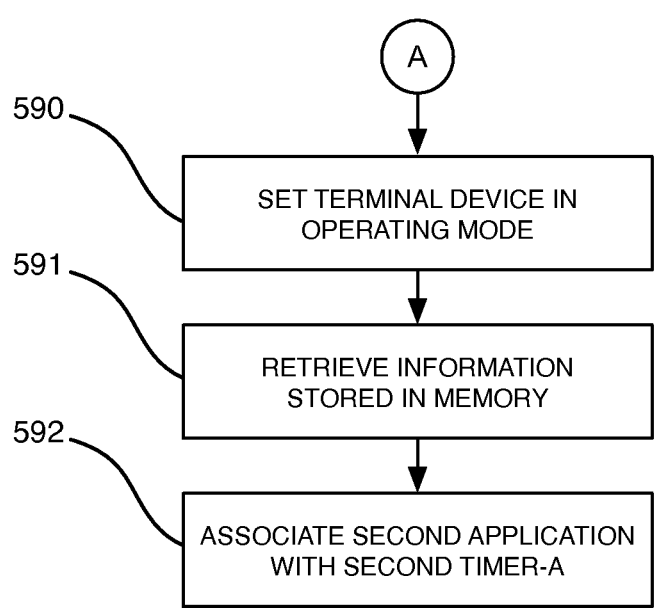

FIGS. 5A and 5B are a flowchart of an exemplary process for controlling a schedule of execution of the applications in the terminal device of FIG. 1 when the terminal device is set in the standby mode. Here, assume that the terminal device 100 includes the first application 381 and the second application 382.

The terminal device 100 may receive the command of setting the terminal device 100 in the standby mode (block 500). The command of setting the terminal device 100 in the standby mode may be generated when the user of the terminal device 100 enters, into the terminal device 100, an input to set the terminal device 100 in the standby mode. Alternatively, the command of setting the terminal device 100 in the standby mode may be generated when a condition of the terminal device 100 meets a predetermined condition. For example, when no input is entered into the terminal device 100 for a predetermined period of time, the command of setting the terminal device 100 in the standby mode may be automatically generated.

The processor 300 may store, in the memory 330, information regarding a timer associated with the second application 382 when the terminal device 100 receives the command of setting the terminal device 100 in the standby mode (block 510). The timer associated with the second application 382 when the terminal device 100 receives the command of setting the terminal device 100 in the standby mode may be a timer in the first timer group 310 or a timer in the second timer group 320.

The processor 300 may determine whether or not the timer associated with the second application 382 when the terminal device 100 receives the command of setting the terminal device 100 in the standby mode is a timer in the second timer group 320 (block 520).

Assume that the timer in the second timer group 320 is the second timer-B 322. When the processor 300 determines that the timer associated with the second application 382 is a timer in the second timer group 320, for example, the second timer-B 322, the processor 300 may set the terminal device 100 in the standby mode (block 530). Alternatively, when the terminal device 100 receives the command of setting the terminal device 100 in the standby mode, the terminal device 100 may be automatically set in the standby mode (block 530).

When the processor 300 determines that the timer associated with the second application 382 when the terminal device 100 receives the command of setting the terminal device 100 in the standby mode is not a timer in the second timer group 320, but, a timer in the first timer group 310, for example, the second timer-A 312, the processor 300 may unassociate the second application 382 with the timer in the first timer group 310 and associate the second application 382 with a timer in the second timer group 320, e.g., the second timer-B 322 (block 525).

The processor 300 may store, in the memory 330, information regarding the timer associated with the second application 382 when the terminal device 100 receives the command of setting the terminal device 100 in the standby mode after the processor 300 determines that the timer associated with the second application 382 is not a timer in the second timer group 320, e.g., the second timer-B 322.

Assuming that the timer in the second timer group 320 associated with the second application is the second timer-B 322, the second timer-B 322 may repeat initialization and measurement of the second amount of elapsed time T22 after the initialization. However, the second timer-B 322 may not initiate wake up of the processor 300 when the second timer-B 322 measures the second amount of elapsed time T22. Accordingly, the processor 300 may not execute the second application 382 when the second timer-B 322 measures the second amount of elapsed time T22.

The processor 300 may determine whether or not the processor 300 receives a signal for initiating wake-up of the processor 300 (block 540).

When the processor 300 determines that the processor 300 receives the signal for initiating wake-up of the processor 300, the processor 300 may wake up (block 550). For example, when the first timer-A 311 associated with the first application 381 measures the first amount of time T11 elapsed since the first timer-A 311 is initialized, the first timer-A 311 may send, to the processor 300, the signal for initiating wake-up of the processor 300. Alternatively, the server 110 may include the first timer-A 311, and may send, to the terminal device 100, the signal for initiating wake-up of the processor 300. Alternatively, the terminal device 100 may generate a signal for initiating wake-up of the processor 300 when a predetermined event occurs.

The processor 300 may determine whether or not, before the processor 300 wakes up, the second timer-B 322 associated with the second application 382 measures the second amount of time T22 elapsed since the second timer-B 322 was initialized (block 560).

When the processor 300 determines that the second timer-B 322 measures the second amount of elapsed time T22 before the processor 300 wakes up, the processor 300 may execute the second application 382 when the processor 300 wakes up (blocks 561).

The second timer-B 322 may be reinitialized after the second timer-B 322 measures the second amount of elapsed time T22 (block 562).

After the processor 300 executes the second application 382, the processor 300 may set the terminal device 100 in the standby mode again (block 570).

The process as indicated by blocks 540-580 may be repeated until the terminal device 100 determines that the terminal device 100 receives the command of setting the terminal device 100 in the operating mode (block 580).

When the terminal device 100 receives the command of setting the terminal device 100 in the operating mode, the processor 300 may set the terminal device 100 in the operating mode (block 590). Then, with respect to the first application 381 and/or the second application 382, the processor 300 may perform the process as described referring to blocks 430-450 in FIG. 4.

The processor may retrieve, from the memory 330, the information regarding the timer associated with the second application 382 when the terminal device 100 receives the command of setting the terminal device 100 in the standby mode (block 591).

The processor 300 may unassociate the second application 382 with the second timer-B 322. Assume that the information to be retrieved is information regarding the second timer-A 312. The processor 300 may associate the second application 382 with the second timer-A 312 (block 592).

When the terminal device 100 receives the command of setting the terminal device 100 in the operating mode during the process as indicated by blocks 540-570, the processor 300 may perform the process as indicated by blocks 590-592, and then, with respect to the first application 381 and/or the second application 382, the processor 300 may perform the process as described referring to blocks 430-450 in FIG. 4.

Instructions to perform the process described above referring to FIGS. 5A-5B may be stored in a non-transitory computer-readable medium.

Figure 6A:
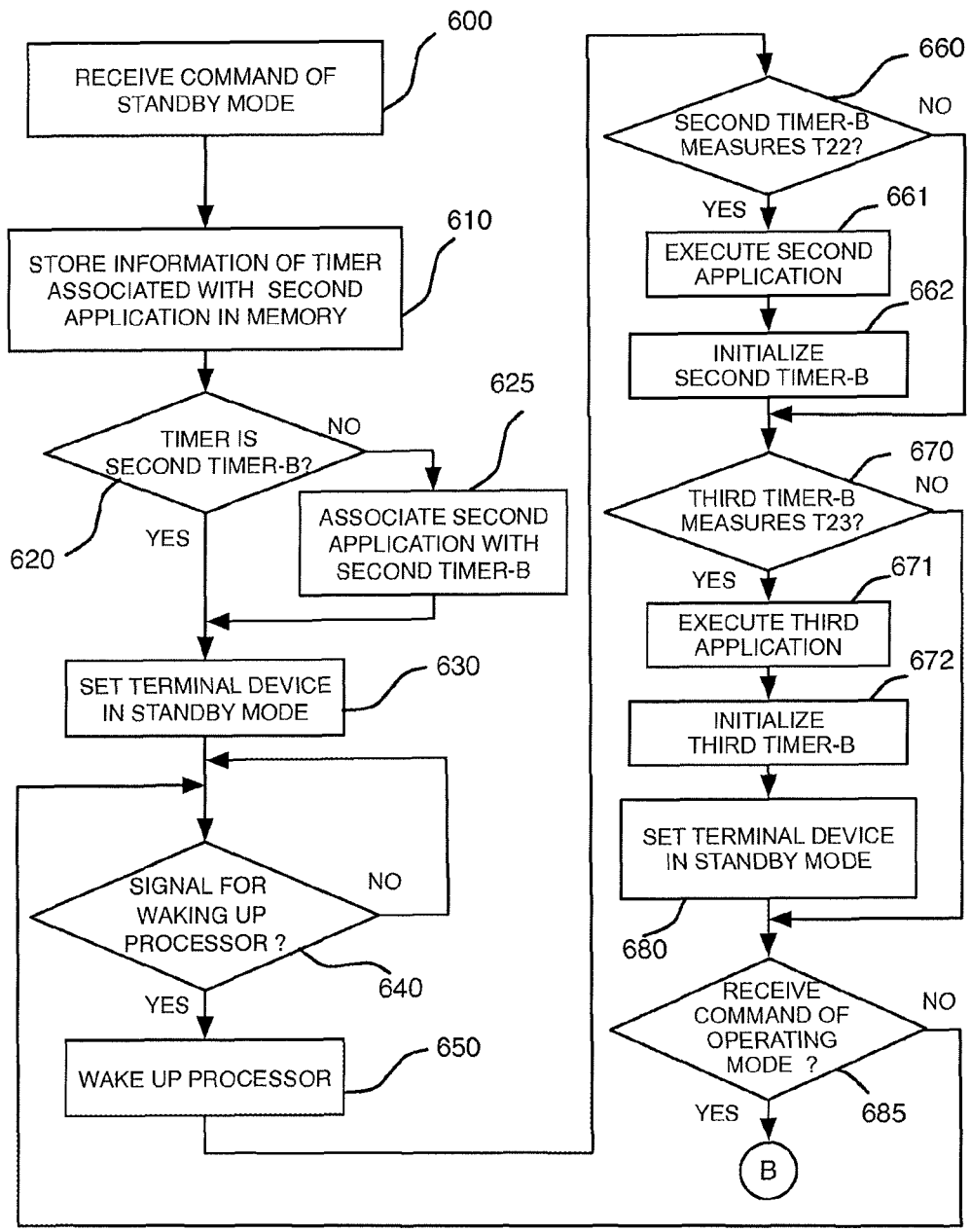
FIGS. 6A and 6B are a flowchart of an exemplary process for controlling schedules of execution of the applications in the terminal device of FIG. 1 when the terminal device is set in standby mode.
Figure 6B:
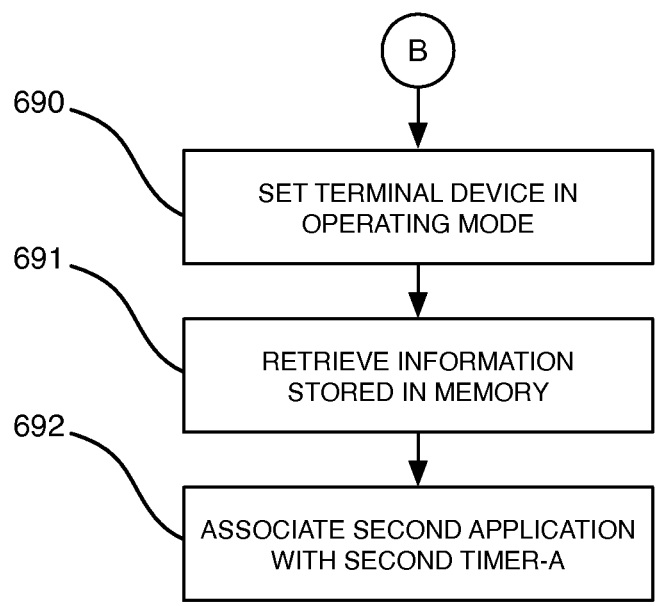

FIGS. 6A and 6B are a flowchart of an exemplary process for controlling schedules of execution of the applications in the terminal device of FIG. 1 when the terminal device is set in standby mode. Here, assume that the terminal device 100 includes that the first application 381, the second application 382, and the third application 383. Also assume that the third application 383 is associated with a timer in the second timer group 320, e.g., the third timer-B 323.

The terminal device 100 may receive the command of setting the terminal device 100 in the standby mode (block 600). The command of setting the terminal device 100 in the standby mode may be generated when the user of the terminal device 100 enters, into the terminal device 100, an input to set the terminal device 100 in the standby mode. Alternatively, the command of setting the terminal device 100 in the standby mode may be generated when a condition of the terminal device 100 meets a predetermined condition. For example, when no input is entered into the terminal device 100 for a predetermined period of time, the command of setting the terminal device 100 in the standby mode may be automatically generated.

The processor 300 may store, in the memory 330, information regarding a timer associated with the second application 382 when the terminal device 100 receives the command of setting the terminal device 100 in the standby mode (block 610). The timer associated with the second application 382 when the terminal device 100 receives the command of setting the terminal device 100 in the standby mode may be a timer in the first timer group 310 or a timer in the second timer group 320.

The processor 300 may determine whether or not the timer associated with the second application 382 when the terminal device 100 receives the command of setting the terminal device 100 in the standby mode is a timer in the second timer group 320 (block 620).

Assume that the timer in the second timer group 320 is the second timer-B 322. When the processor 300 determines that the timer associated with the second application 382 is a timer in the second timer group 320, for example, the second timer-B 322, the processor 300 may set the terminal device 100 in the standby mode (block 630). Alternatively, when the terminal device 100 receives the command of setting the terminal device 100 in the standby mode, the terminal device 100 may be automatically set in the standby mode (block 630).

When the processor 300 determines that the timer associated with the second application 382 when the terminal device 100 receives the command of setting the terminal device 100 in the standby mode is not a timer in the second timer group 320, but, a timer in the first timer group 310, for example, the second timer-A 312, the processor 300 may unassociate the second application 382 with the timer in the first timer group 310 and associate the second application 382 with a timer in the second timer group 320, e.g., the second timer-B 322 (block 625).

The processor 300 may store, in the memory 330, information regarding the timer associated with the second application 382 when the terminal device 100 receives the command of setting the terminal device 100 in the standby mode after the processor 300 determines that the timer associated with the second application 382 is not a timer in the second timer group 320, e.g., the second timer-B 322.

Assuming that the timer in the second timer group 320 associated with the second application is the second timer-B 322, the second timer-B 322 may repeat initialization and measurement of the second amount of elapsed time T22 after the initialization. However, the second timer-B 322 may not initiate wake up of the processor 300 when the second timer-B 322 measures the second amount of elapsed time T22. Accordingly, the processor 300 may not execute the second application 382 when the second timer-B 322 measures the second amount of elapsed time T22.

The processor 300 may determine whether or not the processor 300 receives a signal for initiating wake-up of the processor 300 (block 640).

When the processor 300 determines that the processor 300 receives the signal for initiating wake-up of the processor 300, the processor 300 may wake up (block 650). For example, when the first timer-A 311 associated with the first application 381 measures the first amount of time T11 elapsed since the first timer-A 311 was initialized, the first timer-A 311 may send, to the processor 300, the signal for initiating wake-up of the processor 300. Alternatively, the server 110 may include the first timer-A 311, and may send, to the terminal device 100, the signal for initiating wake-up of the processor 300. Alternatively, the terminal device 100 may generate a signal for initiating wake-up of the processor 300 when a predetermined event occurs.

The processor 300 may determine whether or not, before the processor 300 wakes up, the second timer-B 322 associated with the second application 382 measures the second amount of time T22 elapsed since the second timer-B 322 was initialized (block 660).

When the processor 300 determines that the second timer-B 322 measures the second amount of elapsed time T22 before the processor 300 wakes up, the processor 300 may execute the second application 382 when the processor 300 wakes up (blocks 661).

The second timer-B 322 may be initialized after the second timer-B 322 measures the second amount of elapsed time T22 (block 662).

The processor 300 may determine whether or not the third timer-B 323 measures the third amount of elapsed time T23 before the processor 300 wakes up (block 670).

When the processor 300 determines that the third timer-B 323 measures the third amount of elapsed time T23 before the processor 300 wakes up, the processor 300 may execute the third application 383 (block 671).

The third timer-B 323 may be initialized after the third timer-B 323 measures the third amount of elapsed time T23 (block 672).

After the processor 300 executes the second application 382 and/or the third application 383, the processor 300 may set the terminal device 100 in the standby mode again (block 680).

The process as indicated by blocks 640-685 may be repeated until the terminal device 100 receives the command of setting the terminal device 100 in the operating mode.

When the terminal device 100 receives the command of setting the terminal device 100 in the operating mode (block 685), the processor 300 may set the terminal device 100 in the operating mode (block 690). Then, with respect to the first application 381, the second application 382, and/or the third application 383, the processor 300 may perform the process as described referring to blocks 430-450 in FIG. 4.

The processor may retrieve, from the memory 330, the information regarding the timer associated with the second application 382 when the terminal device 100 receives the command of setting the terminal device 100 in the standby mode (block 691).

The processor 300 may unassociate the second application 382 with the second timer-B 322. Assume that the information to be retrieved is information regarding the second timer-A 312. The processor 300 may associate the second application 382 with the second timer-A 312 (block 692).

When the terminal device 100 receives the command of setting the terminal device 100 in the operating mode during the process as indicated by blocks 640-680, the processor 300 may perform the process as indicated by blocks 690-692, and then, with respect to the first application 381, the second application 382, and/or the third application 383, the processor 300 may perform the process as described referring to blocks 430-450 in FIG. 4.

Instructions to perform the process described above referring to FIGS. 6A-6B may be stored in a non-transitory computer-readable medium.

FIG. 7 is a diagram presenting exemplary timings of wake-up of the processor and execution of the application when the timer associated with the second application is not replaced/changed in response to receiving the command of setting the terminal device of FIG. 1 in the standby mode.

Here, the terminal device 100 including the first application 381, the second application 382, and the third application 383 is set in the standby mode. The first application 381 and the second application 382 are associated with timers in the first timer group, namely, the first timer-A 311 and the second timer-A 312, while the third application 383 is associated with the third timer-B 323.

Dashed lines on a timeline (b) may represent points of time when the first timer-A 311 measures the first amount of time T11 after the first timer-A 311 has been initialized. Dotted lines on a timeline (c) may represent points of time when the second timer-A 312 measures the second amount of time T12 after the second timer-A 312 has been initialized. Dotted-dashed lines on time line (d) may represent points of time when the third timer-B 323 measures the third amount of time T23 after the third timer-B 323 has been initialized.

White bars on a timeline (a) may represent time when the processor 300 wakes up. Black bars on the timeline (b) may represent time when the first application 381 is executed. Black bars on the timeline (c) may represent time when the second application 382 is executed. Black bars on a timeline (d) may represent time when the third application 383 is executed.

When the terminal device 100 is set in the standby mode, the first timer-A 311 associated with the first application 381 may initiate wake-up of the processor 300 to execute the first application 381, and the processor 300 may execute the first application 381.

The first timer-A 311 associated with the first application 381 may measure every T11. A signal indicating that the first timer-A 311 measures the first amount of elapsed time T11 may initiate wake-up of the processor 300. Upon receiving the signal indicating that the first timer-A 311 measures the first amount of elapsed time T11, the processor 300 may wake up, and may execute the first application 381 every T11, as indicated by the black bars on the timeline (b) of FIG. 7. When the operating system is Android and the first application 381 is a data sync application such as Google Sync, the processor 300 may wake up periodically, for example, every twenty-eight minutes to execute the first application 381.

The second timer-A 312 associated with the second application 382 may measure every T12. A signal indicating that the second timer-A 312 measures the second amount of elapsed time T12 may initiate wake-up of the processor 300. Upon receiving the signal indicating that the first timer-B 321 measures the second amount of elapsed time T12, the processor 300 may wake up, and may execute the second application 382 every T12, as indicated by the black bars on the timeline (c) of FIG. 7. When the second application 382 is the application for monitoring an amount of remaining electric charge in the battery 315 associated with the terminal device 100, the processor 300 may wake up periodically, for example, every five minutes to execute the second application 382.

The third timer-B 323 associated with the third application 383 may measure every T23. The third timer-B 323 associated with the third application 383 may not initiate wake-up of the processor 300, since the terminal device 100 is set in the standby mode. However, the processor 300 may execute the third application 383 when the processor 300 wakes up to execute the first application 381 or the second application 382 after the third timer-B 323 measures T23, as indicated by black bars on a timeline (d) of FIG. 7.

As such, in addition to the processor 300's wake-up initiated by the first timer-A 311 associated with the first application 381, the processor 300's wake-up initiated by the second timer-A 312 associated with the second application 382 may increase the number of execution of the third application 383 even when the terminal device 100 is set in the standby mode. Accordingly, the terminal device 100 may consumed electric power, and a charge amount of the battery 315 associated with the terminal device 100 may decrease more than expected in the standby mode.

Figure 8:
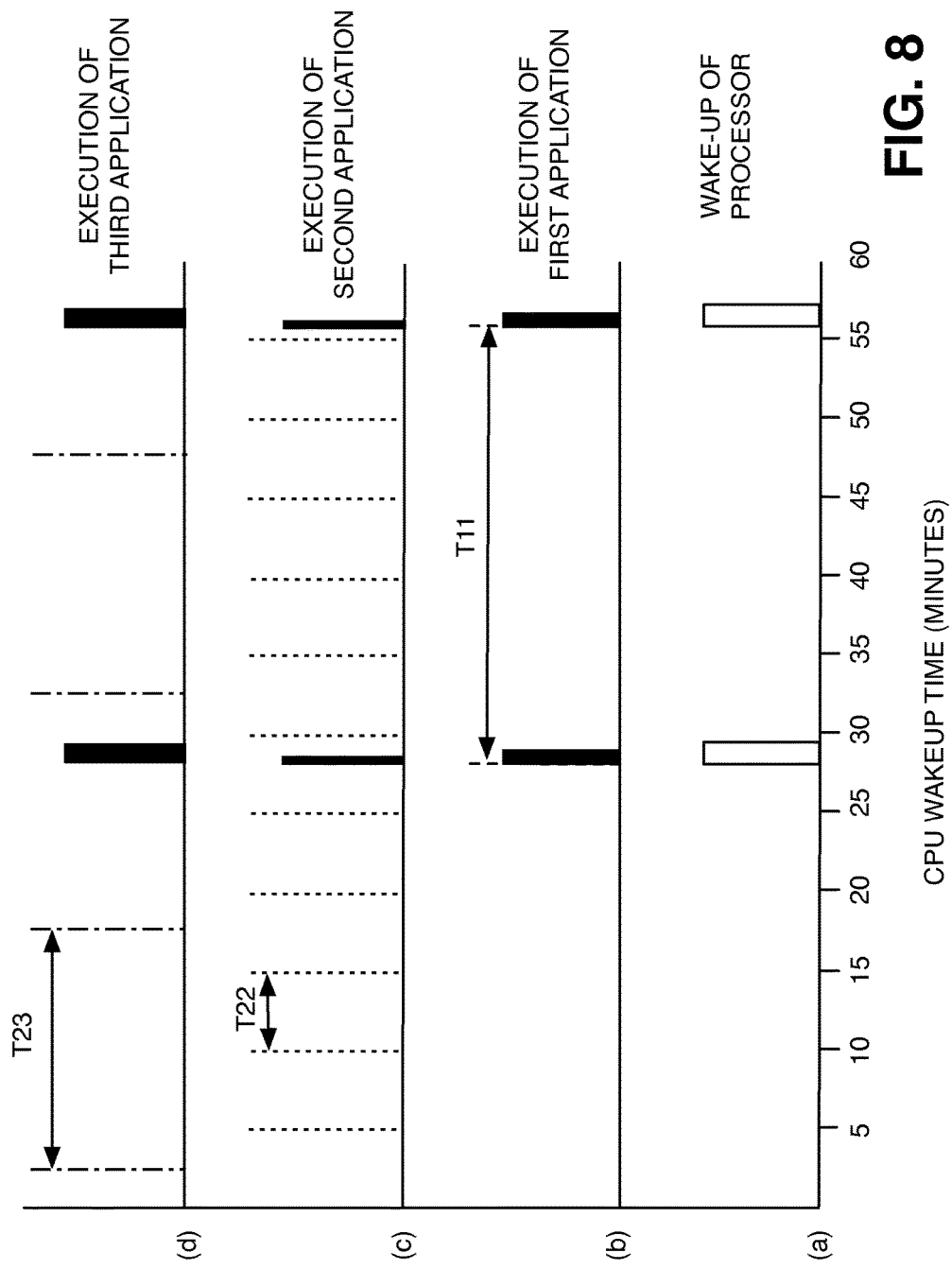
FIG. 8 is a diagram presenting exemplary timings of wake-up of the processor and execution of the applications according to the process of FIGS. 6A-6B.

FIG. 8 is a diagram presenting exemplary timings of wake-up of the processor and execution of the applications according to the process of FIGS. 6A-6B. As described referring to FIGS. 6A-6B, when the terminal device 100 is set in the standby mode, the first application 381 is associated with the first timer-A 311, the second application 382 is associated with the second timer-B 322, and the third application 383 is associated with the third timer-B 323.

Dashed lines on the timeline (b) may represent points of time when the first timer-A 311 measures the first amount of time T11 after the first timer-A 311 is initialized. Dotted lines on the timeline (c) may represent points of time when the second timer-B 322 measures the second amount of time T22 after the second timer-B 322 is initialized. Dotted-dashed lines on the timeline (d) may represent points of time when the third timer-B 323 measures the third amount of time T23 after the third timer-B 323 is initialized.

White bars on the timeline (a) may represent time when the processor 300 wakes up. Black bars on the timeline (b) may represent time when the first application 381 is executed. Black bars on the timeline (c) may represent time when the second application 382 is executed. Black bars on the timeline (d) may represent time when the third application 383 is executed.

When the terminal device 100 is set in the standby mode, the first timer-A 311 associated with the first application 381 may initiate wake-up of the processor 300 to execute the first application 381, and the processor 300 may execute the first application 381.

The first timer-A 311 associated with the first application 381 may measure every T11. A signal indicating that the first timer-A 311 measures the first amount of elapsed time T11 may initiate wake-up of the processor 300. Upon receiving the signal indicating that the first timer-A 311 measures the first amount of elapsed time T11, the processor 300 may wake up, and may execute the first application 381 every Ti, as indicated by the black bars on the timeline (b) of FIG. 8. When the operating system is Android and the first application 381 is a data sync application such as Google Sync, the processor 300 may wake up periodically, for example, every twenty-eight minutes to execute the first application 381.

The second timer-B 322 associated with the second application 382 may measure every T22. When the second application 382 is the application for monitoring an amount of remaining charge in the battery 315 associated with the terminal device 100, the second timer-B 322 may measure every five minutes. A signal indicating that the second timer-B 322 measures the second amount of elapsed time T22 may not initiate wake-up of the processor 300, since the terminal device 100 is set in the standby mode.

The third timer-B 323 associated with the third application 383 may measure every T23. A signal indicating that the third timer-B measures the third amount of elapsed time T23 may not initiate wake-up of the processor 300, since the terminal device 100 is set in the standby mode.

However, if the second timer-B 322 measures the second amount of elapsed time T22 before the processor 300 wakes up to execute the first application 381, the processor 300 may execute the second application 382 when the processor wakes up to execute the first application 381, as indicated by black bars on the timeline (c) of FIG. 8.

Also, if the third timer-B measures the third amount of elapsed time T23 before the processor 300 wakes up to execute the first application 381, the processor 300 may execute the second application 382 when the processor wakes up to execute the first application 381, as indicated by black bars on the timeline (d) of FIG. 8.

Accordingly, when the terminal device 100 is set in the standby mode, the processor 300 may wake up to execute a certain application, for example, the first application 381 such as the data sync application, in the terminal device 100 in the same manner as the operating mode, the number of execution of the second application 382 and the third application 383, and/or other application may be small or a minimum. Consequently, consumption of electric energy in the terminal device 100 may not increase and maintain low, and a charge amount of the battery 315 associated with the terminal device 100 may not decrease more than expected in the standby mode.

Figure 9:
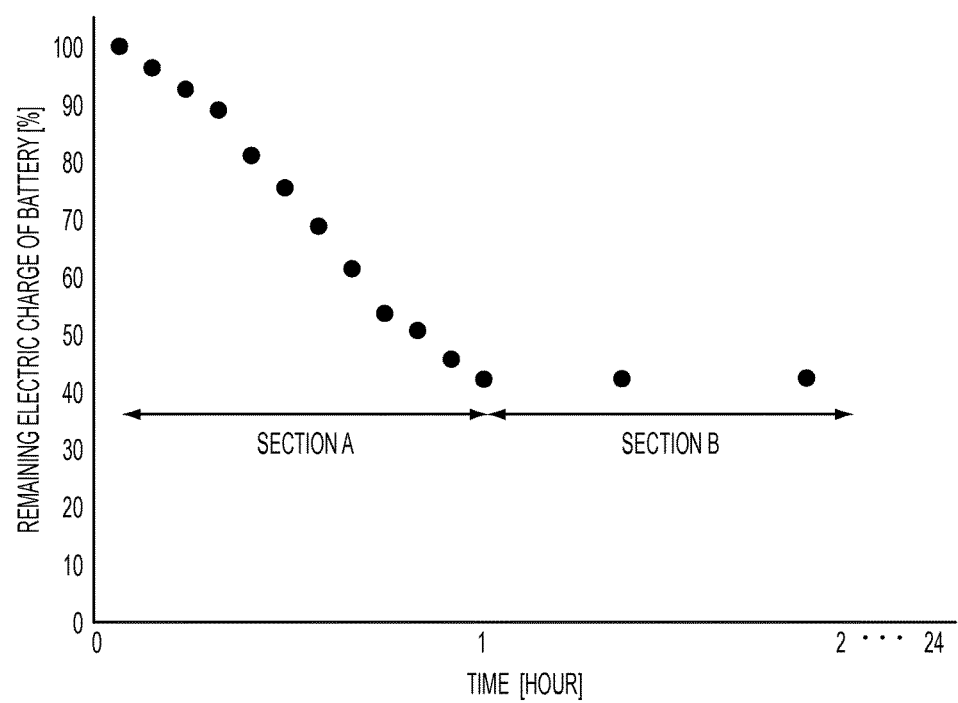

FIG. 9 is a graph of an exemplary relationship between an amount of elapsed time and remaining electric charge of the battery associated with the terminal device of FIG. 1 when a switch of the terminal device is on. A graph in a section A may represent a relationship between an amount of elapsed time and remaining charge of the battery 315 associated with the terminal device 100 when the terminal device 100 is set in the operating mode and is controlled as illustrated in FIG. 4. A graph in a section B may represent a relationship between an amount of elapsed time and remaining electric charge of the battery 315 associated with the terminal device 100 when the terminal device 100 is set in the standby mode and is controlled as illustrated in FIG. 5A or 6A.

When the terminal device 100 is in the operating mode, electric power may be fully supplied to the processor 300 and other components in the terminal device 100, and the processor 300 may operate without sleeping to execute application in the terminal device 100, such as the application of monitoring remaining electric charge of the battery 315, the data sync application, the application of monitoring a process executed in the terminal device 100, and/or other applications of performing other tasks according to the schedule set for the applications. Accordingly, the remaining electric charge of the battery 315 associated with the terminal device 100 may decrease significantly, as shown in the section A of FIG. 9.

On the other hand, when the terminal device 100 is in the standby mode, at least one of the components in the terminal device 100, such as the processor 300, may be idle, or supply of electric power to at least one of the components in the terminal device 100, such as the processor 300, may be reduced or stopped.

For example, the processor 300 may wake up according to the schedule set by the operation system to execute a certain application such as the data sync application, but may not wake up to execute other applications. Rather, the processor 300 may execute other applications when the processor 300 wakes up to execute the certain application. Accordingly, as shown in the section B of FIG. 9, the remaining electric charge of the battery 315 associated with the terminal device 100 may not decrease significantly compared to the operating mode.

Figure 10:
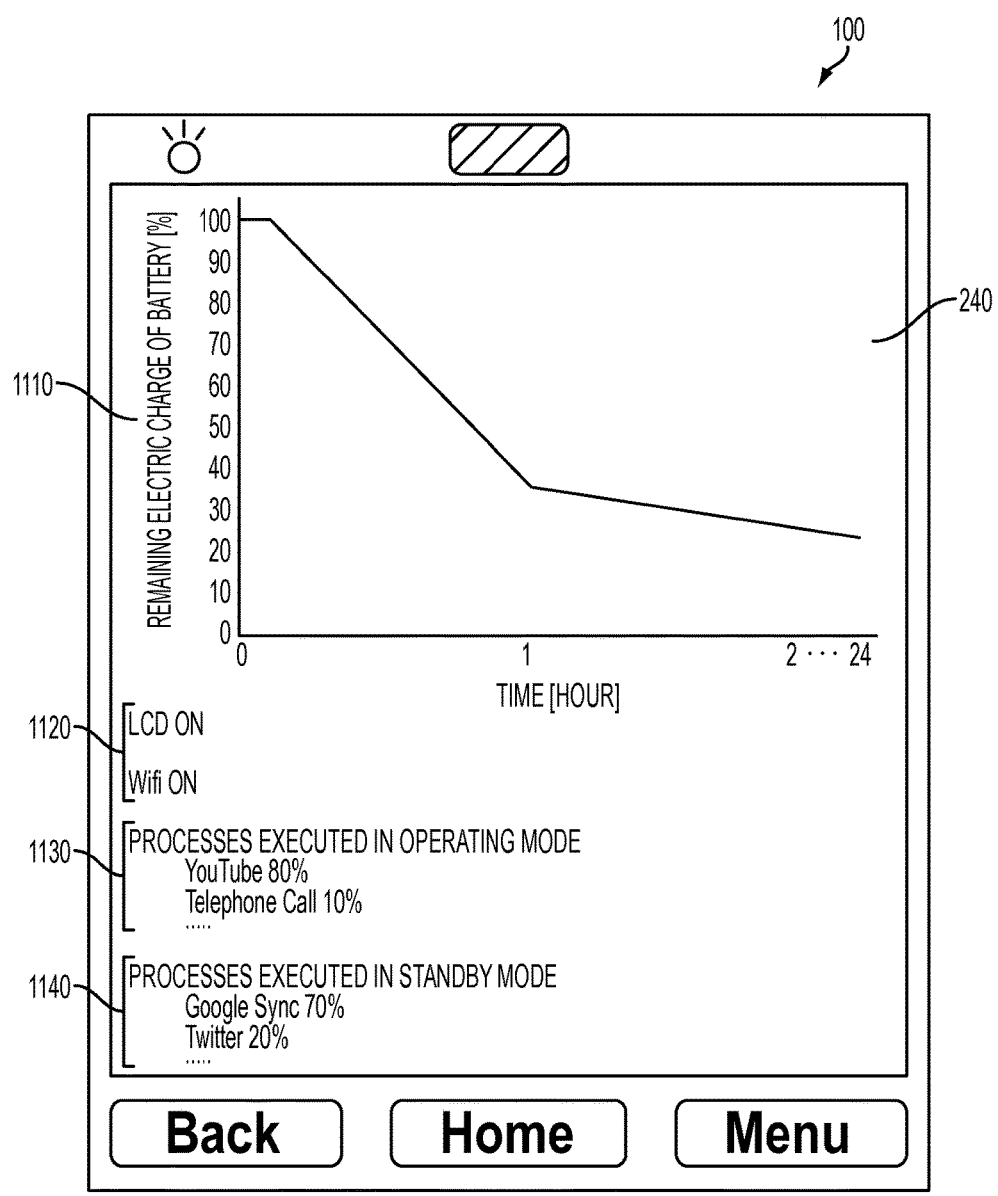
FIG. 10 is an exemplary display of the terminal device of FIG. 1.

FIG. 10 is an exemplary display of the terminal device of FIG. 1. The display 240 of the terminal device 100 may display information related to the application of monitoring remaining electric charge of the battery 315 associated with the terminal device 100.

The information displayed in the display 240 may include at least one of information 1110 regarding the remaining electric charge of the battery 315, information 1120 presenting basic modes which may affect consumption of electric charge in the battery 315, information 1130 regarding one or more processes running in the terminal device 100 when the terminal device 100 is in the operating mode, and information 1140 regarding one or more processes running in the terminal device 100 when the terminal device 100 is in the standby mode.

The user of the terminal device 100 may recognize a history and/or a current status of electric power consumption in the terminal device 100 by observing at least one of the information 1110, 1120, 1130, 1140, or so on. Accordingly, the user of the terminal device 100 may determine which application's execution is to be stopped when the terminal device 100 is set in the standby mode, based on the information displayed on the display 240.

When the terminal device 100 is in the standby mode, frequency of executing the application of monitoring the remaining electric charge of the battery 315 associated with the terminal device 100 may decrease. However, based on data obtained by monitoring the remaining electric charge of the battery 315, the additional data may be superimposed between data obtained by monitoring the remaining electric charge of the battery 315. The obtained data and the additional data may be displayed as the information 1110. Observing the information 1110 including the obtained data and the additional data, the user of the terminal device 100 may recognize a tendency of consumption of the electric charge in the battery 315.

Moreover, the user of the terminal device 100 may recognize which application's execution may affect consumption of electric charge in the battery 315 associated with the terminal device 100 based on the information 1140 regarding one or more processes running in the terminal device 100 when the terminal device 100 is in the standby mode.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

Aspects described herein may be implemented in many different forms of software, firmware, and hardware in the implementations illustrated in the figures. The actual software code or specialized control hardware used to implement aspects does not limit the invention. Thus, the operation and behavior of the aspects were described without various to the specific software code—it being understood that software and control hardware can be designed to implement the aspects based on the description herein.

The term "comprises/comprising," "include/including," and "have/having" as used herein, specifies the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

As used herein, the term "connected to/with" should be construed as the joining of two members directly, indirectly, electrically, or wirelessly to one another. Such joining may be stationary in nature or movable in nature and/or such joining may allow for the flow of electricity, electrical signals, radio frequency signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the terms "include," "for example," "such as," and the like are used illustratively and are not intended to limit the embodiments.

What is claimed is:

1. A terminal device comprising:
a memory configured to store a first application and a second application, the first application and the second application being applications that have data related with the first application and the second application respectively preserved while in a standby mode; and
circuitry, comprising a processor, configured to
implement a first timer associated with the first application;
implement a second timer different from the first timer;
determine whether the first timer wakes up the processor;
in a case where the circuitry determines the first timer wakes up the processor, wake up the processor from the standby mode when the first timer measures a first predetermined amount of elapsed time and, after the processor is woken up, execute the first application and the second application on the processor, wherein the second application does not have a function to wake up the processor from the standby mode in the case where the circuitry determines the first timer wakes up the processor; and
in a case where the circuitry determines the first timer does not wake up the processor, wake up the processor from the standby mode when the second timer measures a second predetermined amount of elapsed time and, after the processor is woken up, execute the first application and the second application on the processor, wherein neither the first application nor the second application has a function to wake up the processor from the standby mode in the case where the circuitry determines the first timer does not wake up the processor.

2. The terminal device of claim 1, wherein the second timer is associated with an operating system.

3. A method performed on a terminal device that has a memory and circuitry including a processor, the method comprising:
storing in the memory a first application and a second application, the first application and the second application being applications that have data related with the first application and the second application respectively preserved while in a standby mode; and
implementing, in the circuitry, a first timer associated with the first application;

implementing, in the circuitry, a second timer different from the first timer;

determining whether the first timer wakes up the processor;

in a case where the determining determines the first timer wakes up the processor, waking up the processor from the standby mode when the first timer measures a first predetermined amount of elapsed time and, after the processor is woken up, executing the first application and the second application on the processor, wherein the second application does not have a function to wake up the processor from the standby mode in the case where the determining determines the first timer wakes up the processor; and in a case where the determining determines the first timer does not wake up the processor, waking up the processor from the standby mode when the second timer measures a second predetermined amount of elapsed time and, after the processor is woken up, executing the first application and the second application on the processor, wherein neither the first application nor the second application has a function to wake up the processor from the standby mode in the case where the determining determines the first timer does not wake up the processor.

4. A non-transitory, computer-readable medium storing instructions that, when executed on a terminal device that has a memory and circuitry including a processor, control the terminal device to perform a method comprising:

storing in the memory a first application and a second application, the first application and the second application being applications that have data related with the first application and the second application respectively preserved while in a standby mode; and implementing, in the circuitry, a first timer associated with the first application;

implementing, in the circuitry, a second timer different from the first timer;

determining whether the first timer wakes up the processor;

in a case where the determining determines the first timer wakes up the processor, waking up the processor from the standby mode when the first timer measures a first predetermined amount of elapsed time and, after the processor is woken up, executing the first application and the second application on the processor, wherein the second application does not have a function to wake up the processor from the standby mode in the case where the determining determines the first timer wakes up the processor; and in a case where the determining determines the first timer does not wake up the processor, waking up the processor from the standby mode when the second timer measures a second predetermined amount of elapsed time and, after the processor is woken up, executing the first application and the second application on the processor, wherein neither the first application nor the second application has a function to wake up the processor from the standby mode in the case where the determining determines the first timer does not wake up the processor.

* * * * *